United States Patent
Lee et al.

(10) Patent No.: US 9,975,453 B2
(45) Date of Patent: May 22, 2018

(54) APPARATUS FOR CONTROLLED POWER SEAT OF VEHICLE AND METHOD THEREOF

(71) Applicant: HYUNDAI DYMOS INCORPORATED, Seosan-si, Chungcheongnam-do (KR)

(72) Inventors: Ho Cheoul Lee, Osan-si (KR); Seung Kyu Lee, Hwaseong-si (KR)

(73) Assignee: HYUNDAI DYMOS INCORPORATED, Seosan-Si (KR)

( * ) Notice: Subject to any disclaimer, the term of this patent is extended or adjusted under 35 U.S.C. 154(b) by 0 days. days.

(21) Appl. No.: 15/380,978

(22) Filed: Dec. 15, 2016

(65) Prior Publication Data
US 2017/0174102 A1    Jun. 22, 2017

(30) Foreign Application Priority Data

Dec. 21, 2015    (KR) .......................... 10-2015-0183223

(51) Int. Cl.
*B60N 2/02*    (2006.01)
*B60N 2/06*    (2006.01)
*B60N 2/22*    (2006.01)

(52) U.S. Cl.
CPC .......... *B60N 2/0228* (2013.01); *B60N 2/0232* (2013.01); *B60N 2/06* (2013.01); *B60N 2/22* (2013.01)

(58) Field of Classification Search
CPC ...... B60N 2/0228; B60N 2/0232; B60N 2/06; B60N 2/22
See application file for complete search history.

(56) References Cited

U.S. PATENT DOCUMENTS

| | | | |
|---|---|---|---|
| 6,677,720 B2 * | 1/2004 | Fraser ................. | B60N 2/0244 297/284.1 |
| 8,193,746 B2 * | 6/2012 | Jimenez Pino ...... | B60N 2/0244 318/268 |
| 2009/0289486 A1 * | 11/2009 | Jimenez Pino ...... | B60N 2/0232 297/344.1 |
| 2013/0049669 A1 * | 2/2013 | Han ..................... | B60N 2/0248 318/565 |
| 2013/0154534 A1 * | 6/2013 | Okada ................. | B60N 2/0232 318/490 |

* cited by examiner

*Primary Examiner* — Shawki S Ismail
*Assistant Examiner* — Muhammad S Islam
(74) *Attorney, Agent, or Firm* — Womble Bond Dickinson (US) LLP

(57) ABSTRACT

The present disclosure relates to an apparatus for controlled power seat of vehicle designed to improve the problem of seat pinching by changing an initial torque value of a seat motor according to a moving direction of a seat and method thereof.

6 Claims, 3 Drawing Sheets

APPARATUS FOR CONTROLLED POWER SEAT OF VEHICLE AND METHOD THEREOF

CROSS-REFERENCE TO RELATED APPLICATIONS

This application claims the benefit under 35 USC 119(a) of Korean Patent Application No. 10-2015-0183223 filed on Dec. 21, 2015, in the Korean Intellectual Property Office, the entire disclosure of which is incorporated herein by reference for all purposes.

BACKGROUND

Field

The present disclosure relates to an apparatus for controlled power seat of vehicle and method thereof and more particularly, to an apparatus for controlled power seat of vehicle designed to improve the problem of seat pinching in the movement of a vehicle's power seat and method thereof.

Description of the Related Art

In general, a power seat of vehicle is devised to maintain a passenger's seating posture and is composed of a seat cushion and a seatback on a seat frame which moves a seat rail. Further, a sliding apparatus and a reclining apparatus are equipped on the back side of a seat rail and seat frame to maintain a posture appropriate for driving and a posture appropriate for a passenger's body type.

The power seat apparatus allows a passenger to operate a lever or switch by hands and thus transforms electric power to physical kinetic energy. And the operation of a sliding apparatus and a reclining apparatus moves the seat in antero-posterior direction or controls the lean angle of a seat back.

Recently, in the light of promoting benefits of a passenger, a power seat (or also called memory seat) which is designed to electrically operate a seat has been widely used.

However, such a conventional power seat apparatus may cause a problem of seat pinching in the movement of a seat by a blocking of a seat movement at the physical end of a seat movement section or by an apparatus disorder in the interval.

FIG. 1 is an exemplary drawing illustrating a seat pinching phenomenon in a general movement of a power seat.

As illustrated, when a seat 10 moves, a seat can no longer move at a or b which is a physical end of a seat movement section, an output of a hall sensor (not illustrated) becomes 0. Further, when a seat pinching occurs by an apparatus disorder at the mid-point c of a seat movement section, a pinching phenomenon is recognized as a hall sensor error, namely the output becomes 0. In this way, when a sensing signal is not output from a hall sensor, a seat pinching phenomenon is judged.

In this manner, a seat pinching phenomenon can occur at a certain point (c point) of a sliding movement section as well as at the end of a sliding movement section (a, b, point). In this case, as a seat motor is in the state of operation, a motor signal is output. However, a sensing signal is not output as a hall sensor is in the state of error.

Here at, when a seat pinching occurs, a soft start mode is usually applied in a conventional power seat apparatus. A control logic of a soft start mode is designed to slowly control the speed of a motor at the time of an initial operation. And this is for the purpose of reducing a shock and a reaction at the time of a motor operation of a power seat.

However, as the conventional power seat apparatus always applies a soft start mode regardless of the moving direction of a seat when a hall sensor error occurs, when a seat pinching phenomenon occurs at the end points (a, b points) of the sliding movement section as illustrated above, the seat should be moved to the opposite direction. However, at this time, it is impossible to escape from the pinching phenomenon as the initial supplied current is deficient according to the soft start mode and the problem of the occurrence of unnecessary impulse sound also existed.

SUMMARY

The present disclosure is directed to providing an apparatus for controlled power seat of vehicle and method thereof which is designed to resolve a seat pinching phenomenon by changing an initial torque value of a seat motor according to a direction of movement of a seat when a power seat pinching phenomenon of a vehicle occurs.

According to an aspect of the present disclosure, an apparatus for controlled power seat of vehicle and method thereof may include: a control switch which controls the direction of operation and movement of a seat; a seat motor which provides a driving power for the movement of the seat; a hall sensor which senses a signal generated in the movement of the seat; a control unit which controls a maneuver of the seat motor by receiving a sensing signal of the hall sensor and a moving direction of a seat by the control switch and by selecting a single driving mode according to a moving direction of the seat when a hall sensor error occurs.

A single driving mode selected at the control unit operates the seat motor by selecting a soft start mode when the seat moves in the same direction with the prior moving direction and operates the seat motor by selecting a hard start mode when the seat moves in the opposite direction of the prior moving direction.

The control unit operates the seat motor at the minimum current amount of the current range at the soft start mode, and it operates the seat motor at the maximum current amount of the current range at the hard start mode.

The soft start mode operates by transforming the driving current of the seat motor to normal current amount when the standard time passes or the hall sensor signal is normally output by sensing after the seat motor is operated at the minimum current amount.

The hard start mode cuts the driving current of the seat motor when the hall sensor signal is not normally sensed until the seat motor operates at the maximum current and a predetermined time passes.

According to the other characteristic of the present disclosure, the method may include: controlling of the movement and moving direction of a seat by a control switch; moving a seat by operating a seat motor; sensing signals which are generated in the movement of the seat by a hall sensor; judging whether a hall sensor error occurs by the control unit and controlling of the operation of the seat motor by selecting a single driving mode according to the moving direction of a seat by judging the seat motor is in the same direction with the prior movement.

According to a single driving mode selected at the control unit, operating the seat motor at the soft start mode when the seat moves in the same direction with the prior moving direction; and operating the seat motor at the hard start mode when the seat moves in the opposite direction to the prior moving direction.

Operating the seat motor at the minimum current amount of the current range at the soft start mode and operating the seat motor at the maximum current amount of the current range at the hard start mode are desirable.

According to an exemplary embodiment of the apparatus for controlled power seat of vehicle and method thereof, applying a soft start mode in case of the same direction and applying a hard start mode in case of the opposite direction by changing the initial torque value of a seat motor according to a moving direction of a seat when a power seat pinching phenomenon of a vehicle occurs allow a smooth escape from a pinching depending on pinching situations and prevent unnecessary shocking noises.

DETAILED DESCRIPTION OF THE EMBODIMENT

Figure 1:
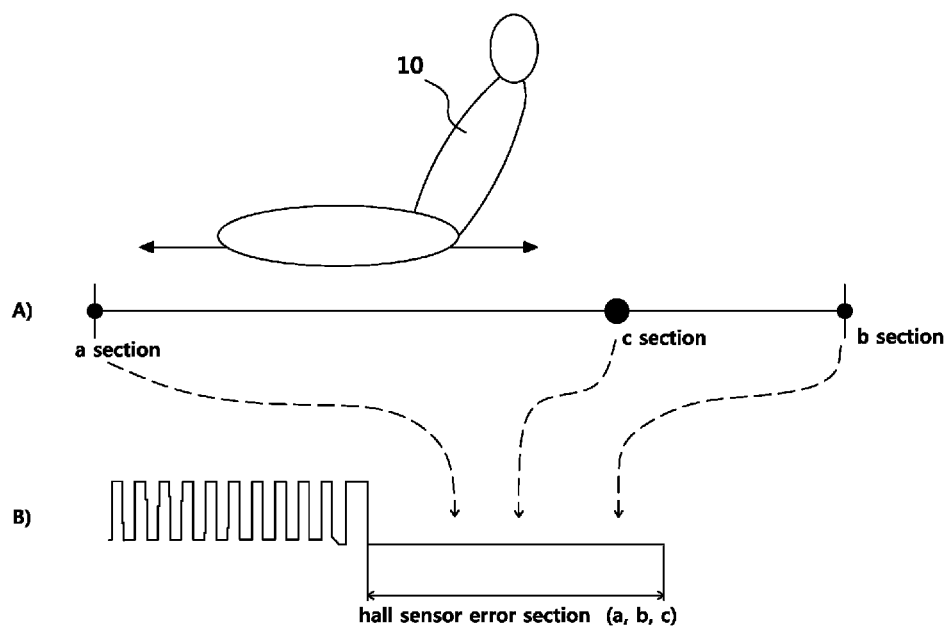
FIG. 1 is an exemplary drawing illustrating a seat pinching phenomenon when a general power seat movement occurs.

The present disclosure may have various modifications and several exemplary embodiments to the present invention and specific exemplary embodiments will be illustrated in the drawings and described in detail in detailed description. In describing the present invention, when it is determined that a detailed description of related well-known technology may obscure the gist of the present invention, the detailed description thereof will be omitted.

Hereinafter, preferred embodiments of the present disclosure will be described in detail with reference to the accompanying drawings.

Figure 2:
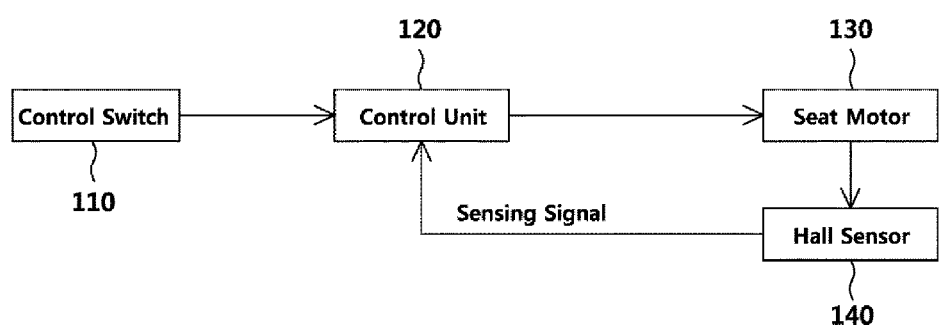
FIG. 2 is a block diagram illustrating an apparatus for controlled power seat according to an exemplary embodiment of the present disclosure.

FIG. 2 is a block diagram illustrating an apparatus for controlled power seat according to an exemplary embodiment of the present disclosure.

As illustrated, an apparatus for controlled power seat according to an exemplary embodiment of the present disclosure comprises a control switch 110, a control unit 120, a seat motor 130, and a hall sensor 140.

More particularly, most of all, a control switch 110 which controls the operation and the moving direction of a seat 10 is equipped.

The control switch 110 is composed as prominent on the side structure of the seat 10, and signifies a switch for controlling a slide and a reclining seat. Through this, a passenger can obtain an optimal seat location by a simple control.

A seat motor 130 which outputs a driving force to slide a seat 10 is composed according to the control of the control switch 110.

A hall sensor 140 is composed at the side of the seat motor 130. The hall sensor 140 outputs sensing signals when a seat motor 130 operates. However, when a seat pinching phenomenon occurs, while motor output signals are generated as the seat motor 130 keeps operating, a hall sensor 140 does not output sensing signals due to no seat movement. In this manner, when the hall sensor 140 is used, the consideration of temperature or current amount according to supplied voltages is not necessary.

As it is possible to use a hall sensor 140 in case of manufacturing a real vehicle, an addition of a separate hall sensor is not necessary. Thus, the problem of rise of manufacturing cost does not occur. The hall sensor 140 can be separately composed from the seat motor 130.

A control unit 120 which controls the operation of the seat motor 130 is composed according to the control of a control switch 110. Although the control unit 120 controls the calculation of the present location of a seat, the storage of a target location, and the function of movement to a target location, the control unit according to an exemplary embodiment of the present disclosure takes the role of performing a hard start mode and a soft start mode according to the output of the hall sensor 140.

Namely, the control unit 120 receives the direction of a seat 10 by the control switch 110 and the sensing signals of the hall sensor 140, and controls the operation of the seat motor 130 by selecting a single driving mode according to the moving direction of a seat.

At this time, a single driving mode selected at the control unit 120 operates the seat motor 130 by selecting a soft star mode when the seat 10 moves in the same direction with the prior moving direction. Meanwhile, it operates the seat motor 130 by selecting a hard start mode when the seat 10 moves in the opposite direction from the prior moving direction.

Herein, the hard start mode is 100% duty mode, and the soft start mode is sequential operation control logic.

Namely, the seat motor 130 operates the seat motor 130 at the minimum current amount of the current range at the soft start mode, the seat motor 130 operates the seat motor 130 at the maximum current amount of the current range at the hard start mode.

And at the soft start mode, the driving current of the seat motor 130 can be changed to the normal current amount when a predetermined time passes or the hall sensor 140 signals are sensed and normally output after the seat motor 130 is operated at the minimum current amount.

Further, at the hard start mode, the driving current or voltage of the seat motor 130 is blocked when the hall sensor 140 signals are not normally sensed until the seat motor 130 operates at the maximum current amount and a predetermined time passes.

Figure 3:
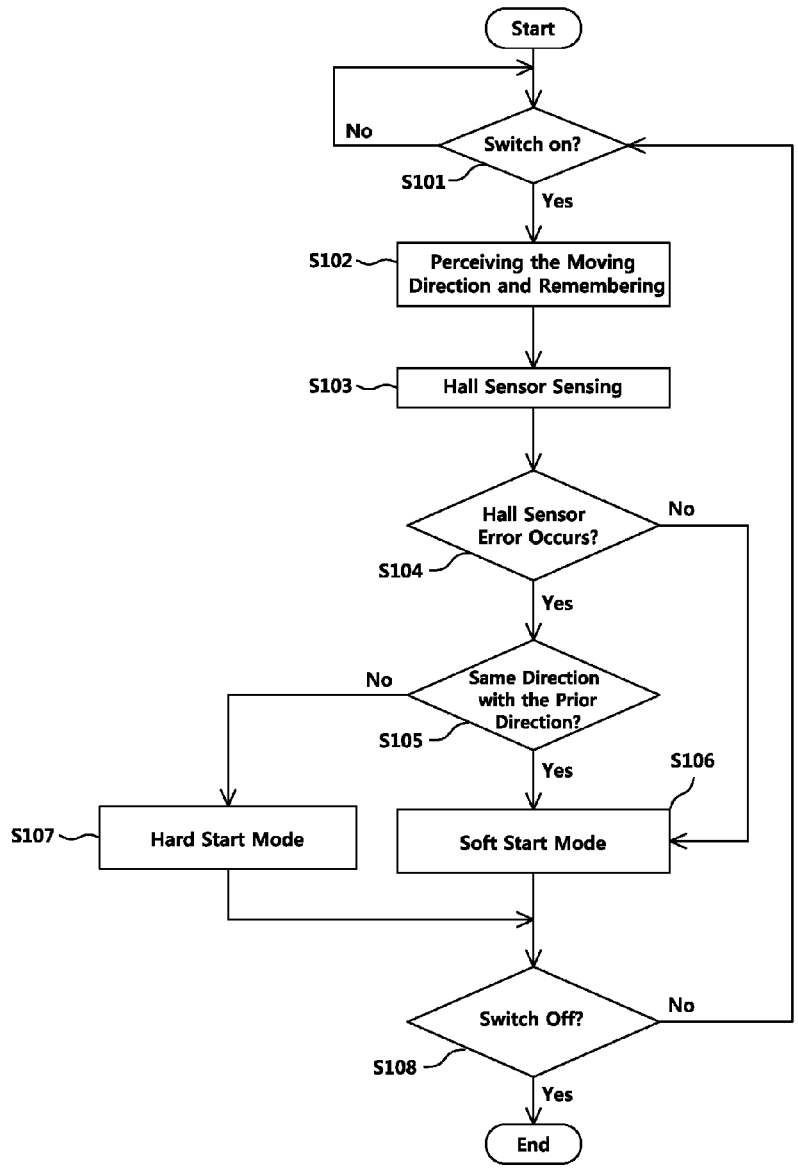
FIG. 3 is a flow chart illustrating a controlling method of a power seat of a vehicle according to an exemplary embodiment of the present disclosure.
Figure 4:
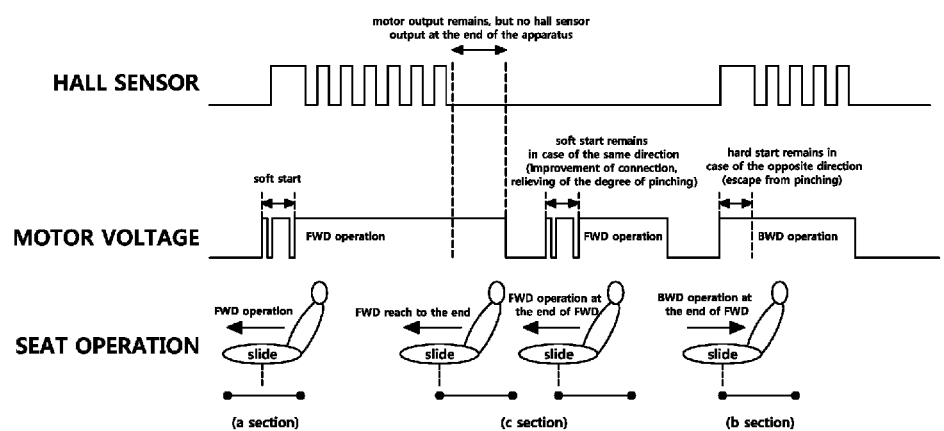
FIG. 4 is an exemplary drawing illustrating a seat pinching phenomenon at the movement of a power seat of a vehicle according to an exemplary embodiment of the present disclosure.

FIG. 3 is a flow chart illustrating a controlling method of a power seat of a vehicle according to an exemplary embodiment of the present disclosure, and FIG. 4 is an exemplary drawing illustrating a seat pinching phenomenon at the movement of a power seat of a vehicle according to an exemplary embodiment of the present disclosure.

First, a passenger controls the control switch 110 to move the location of the seat 10 (S101).

Then, the control unit 120 moves the seat 10 in anteroposterior direction according to the controlled direction of the control switch 110. In this case, the seat 10 moves while the control switch 110 is controlled or the seat 10 moves up to the point of a predetermined location based on the memorized information in case of a memory-type power seat, and such a moving direction is perceived and remembered at a separate memory (not illustrated)(S102).

However, the seat 10 may not move in such a state. Namely, a seat pinching phenomenon may occur.

A seat pinching phenomenon is judged by the control unit 120 based on whether the sensing signals of the hall sensor 140 are output (S103). Namely, when the control switch 110 is controlled as above, the control unit 120 judges whether sensing signals are output from the hall sensor 140. It is considered that a seat pinching phenomenon is occurred when sensing signals are not output from the hall sensor, and this is also called a hall sensor error status.

The control unit 120 judges that a seat pinching phenomenon occurs when sensing signals are not output from the hall sensor 140. A seat pinching phenomenon can occur at a particular point (c point) of the sliding moving section as well as at the end points (a, b points) of the sliding moving section as illustrated in FIG. 4. In this case, while motor signals are output as the seat motor 130 is in the operating mode, sensing signals are not output as the hall sensor 140 is in error state. For reference, in FIG. 4, the c section marks the point where a seat pinching phenomenon occurs of the entire moving section of the seat 10, and a, b sections mark the hall sensor error section with motor output signals of the seat 10. Like this, a seat pinching phenomenon occurs at the both ends of the physical moving section of a seat and by an apparatus disorder.

In this manner, the control unit 120 judges whether the hall sensor error occurs as sensing signals are not generated when the control switch 110 is controlled while monitoring the output status of the hall sensor 140. At the same time, the control unit 120 judges whether the seat motor 130 is in the same direction with the prior moving direction (S104~S105).

According to the judgment of the control unit 120, the hall sensor 140 error occurs, and the seat motor 130 is operated when the seat 10 moves in the same direction with the prior moving direction. Namely, the seat motor 130 is operated at the minimum current amount of the current range of the control unit 120 at the soft start mode (S106).

At this time, the control unit 120 performs a soft start mode as the seat moves in the same direction despite of a seat pinching phenomenon. Therefore, a soft start is possible as a minimum current needed for sliding movement is provided at the initial operation and an increased amount of current is provided afterwards.

Meanwhile, according to the judgment of the control unit 120, the hall sensor 140 error occurs, and the seat motor 130 is operated at the hard start mode when the seat 10 moves in the opposite direction from the prior moving direction. Namely, the control unit 120 operates the seat motor 130 at the maximum current amount of the current range at the hard start mode. Accordingly, the seat motor 130 moves the seat in the opposite direction while driving at duty 100% due to enough amount of driving force (S107).

Namely, when a seat pinching phenomenon occurs, the initial driving current is deficient and moving a seat is impossible when currents are provided at a general soft start mode. Herein, the operating mode according to the duty 100% is a power supply which can be provided at the side of the seat motor 130 among the power supplies. For instance, as a battery power is supplied to diverse electric/electronic appliances equipped in a vehicle when a vehicle is on, the rest power is supplied to a starting motor. Such amount of power supplies are greater than those supplied at the soft start.

Meanwhile, the seat motor 130 is always operated at a start mode regardless of the moving direction of the seat 10 when the hall sensor 140 error does not occur.

As explained above, the present disclosure applies either a soft start mode—when a seat moves in the same direction—or a hard start mode—when a seat moves in the opposite direction—by changing the initial torque value according to the moving direction of a seat in case a power seat pinching phenomenon occurs. Thus, the present disclosure smoothly resolves a pinching and prevents unnecessary shocking noises.

Therefore, configurations illustrated in the embodiments of the present disclosure in the present specification are only the most preferred embodiment of the present disclosure and do not represent all of the technical spirit of the present disclosure, and thus it is to be understood that various modified examples, which may replace the configurations, are possible when filing the present application. The present disclosure is not limited to the specific exemplary embodiment of the present disclosure, and a person of ordinary skill in the art may variously modify and work the present disclosure without departing from the principals of the present disclosure defined in the claims, and the modification belongs to the scope of the claims.

What is claimed is:

1. An apparatus for controlled power seat of vehicle and method thereof, comprising:
    a control switch which controls the direction of operation and movement of a seat;
    a seat motor which provides a driving power for the movement of the seat;
    a hall sensor which senses a signal generated in the movement of the seat;
    a control unit which controls a maneuver of the seat motor by receiving a sensing signal of the hall sensor and a moving direction of a seat by the control switch and by selecting a single driving mode according to a moving direction of the seat when a hall sensor error occurs,
    wherein the single driving mode selected at the control unit operates the seat motor by selecting a soft start mode when the seat moves in a same direction with the prior moving direction and operates the seat motor by selecting a hard start mode when the seat moves in the opposite direction of the prior moving direction.

2. The apparatus for controlled power seat of vehicle according to claim 1 wherein the control unit operates the seat motor at the minimum current amount of the current range at the soft start mode, and it operates the seat motor at the maximum current amount of the current range at the hard start mode.

3. The apparatus for controlled power seat of vehicle according to claim 2, wherein the soft start mode operates by transforming the driving current of the seat motor to current amount when the standard time passes or the hall sensor signal is normally output by sensing after the seat motor is operated at the minimum current amount.

4. The apparatus for controlled power seat of vehicle according to claim 2, wherein the hard start mode cuts the driving current of the seat motor when the hall sensor signal is not normally sensed until the seat motor operates at the maximum current and a predetermined time passes.

5. The method of controlling power seat of vehicle, comprising:
    controlling of the movement and moving direction of a seat by a control switch;
    moving a seat by operating a seat motor;
    sensing signals which are generated in the movement of the seat by a hall sensor;
    judging whether a hall sensor error occurs by the control unit and controlling of the operation of the seat motor by selecting a single driving mode according to the moving direction of a seat by judging the seat motor is in the same direction with the prior movement, wherein the controlling of the operation of the seat motor comprises operating the seat motor at the soft start mode when the seat moves in the same direction with the prior moving direction; and operating the seat motor at the hard start mode when the seat moves in the opposite direction to the prior moving direction.

6. The method of controlling power seat of vehicle of claim 5, wherein operating the seat motor at the minimum current amount of the current range at the soft start mode and operating the seat motor at the maximum current amount of the current range at the hard start mode.

* * * * *